United States Patent [19]

Keogh et al.

[11] Patent Number: 4,598,116

[45] Date of Patent: Jul. 1, 1986

[54] SCORCH RESISTANT COMPOSITIONS BASED ON WATER-CURABLE THERMOPLASTIC POLYMERS HAVING HYDROLYZABLE, PENDANT SILANE MOIETIES, AND ORGANO TITANATES

[75] Inventors: Michael J. Keogh, Bridgewater; Gary H. Williams, Somerville, both of N.J.

[73] Assignee: Union Carbide Corporation, Danbury, Conn.

[21] Appl. No.: 669,753

[22] Filed: Nov. 9, 1984

[51] Int. Cl.[4] ............................................... C08K 5/04
[52] U.S. Cl. .................................... 524/398; 524/783; 525/106; 525/288
[58] Field of Search ................ 524/398, 783; 525/106, 525/288

[56] References Cited

U.S. PATENT DOCUMENTS 3,646,155  2/1972  Scott .
4,291,136  9/1981  Keogh .
4,328,323  5/1982  Keogh .
4,446,279  5/1984  Keogh .

Primary Examiner—Joseph L. Schofer
Assistant Examiner—N. Sarafim
Attorney, Agent, or Firm—James C. Arvantes

[57] ABSTRACT

Scorch resistant compositions comprising thermoplastic polymers having hydrolyzable, pendant silane moieties, prepared in the presence of a free radical generating compound and organo titanates, which are particularly useful as extrudates about wires and cables.

34 Claims, No Drawings

SCORCH RESISTANT COMPOSITIONS BASED ON WATER-CURABLE THERMOPLASTIC POLYMERS HAVING HYDROLYZABLE, PENDANT SILANE MOIETIES, AND ORGANO TITANATES

SUMMARY OF THE INVENTION

This invention relates to scorch resistant compositions based on water-curable thermoplastic polymers having hydrolyzable, pendant silane moieties, prepared in the presence of a free radical generating compound, and organo titanates. The compositions of this invention are particularly useful in extrusion applications, being capable of extrusion about wires and cables and water-cured to crosslinked products.

BACKGROUND OF THE INVENTION

Currently, two major processes, so-called peroxide-curing and water-curing, are being employed in the application of protective coatings such as insulation and jacketing about wires and cables. The peroxide-curing process involves extruding compositions containing an organic peroxide about wires and cables and subjecting the resultant articles to elevated temperatures in order to cure the compositions to crosslinked products. The overall operation requires careful control of the process parameters in order to avoid undue heat and pressure build-up in the extruder. Undue heat and pressure build-up results in premature decomposition of the peroxides which in turn results in crosslinking of the compositions in the extruder. Crosslinking of the compositions in the extruder, commonly referred to as "scorch" necessitates, in extreme cases, stopping the operation and cleaning the extruder. In situations wherein "scorch" occurs but is not as severe, it has been found that the work-life of the ultimate coatings is relatively short. In addition to the processing difficulties of peroxide-curing, the peroxide containing compositions do not have that degree of resistivity to deformation, at normal peroxide loadings, demanded by many ultimate users of insulated and jacketed wire and cable articles.

The water-curing process, on the other hand, involves compositions containing hydrolyzable, silane modified thermoplastic polymers and is more commercially attractive in that a wider latitude in processing conditions is possible. That is, compositions containing water-curable, silane modified polymers can be extruded at temperatures far in excess of maximum processing temperatures used in extruding peroxide containing compositions. Being capable of extrusion at higher temperatures, such compositions can be extruded at faster rates and under lower pressure and consequently are more cost effective.

A disadvantage with respect to the so-called water-curing process is the water sensitivity of the hydrolyzable thermoplastic polymers. During normal handling and processing, these polymers tend to hydrolyze, determined by infra-red spectroscopic analysis; and in the presence of metal carboxylate, silanol condensation catalysts tend to prematurely crosslink. As an illustration, water-curable compositions are generally formulated by admixing, in an extruder, a water-curable, silane modified thermoplastic polymer with a metal carboxylate silanol condensation catalyst such as dibutyltin dilaurate, extruding the resultant composition about a wire or cable and thereafter passing the coated wire or cable through a water bath in order to cure the coating to a crosslinked product. It has been found, however, that upon admixing the water-curable, silane modified thermoplastic polymer with a metal carboxylate silanol condensation catalyst, the resultant composition tends to prematurely crosslink in the extruder. This premature crosslinking, commonly referred to as "scorch" manifests itself in the extruded coating in the form of surface discontinuity and roughness. In some instances, excessive scorching, as previously stated, may cause enough of a pressure build-up in the extruder to require a cessation of the entire extrusion operation. Consequently, as a result of the "scorch" problem, the water-curing process has not found wide commercial acceptance in the United States.

DETAILED DESCRIPTION OF THE INVENTION

According to the present invention, scorch resistant, water-curable compositions are provided comprising a preformed water-curable thermoplastic polymer having hydrolyzable, pendant silane moieties, prepared in the presence of a free radical generating compound, and an organo titanate wherein the organo titanate is present in an amount of at least about 0.05 percent by weight, generally about 0.05 to about 10 percent by weight and preferably about 0.1 to about 5 percent by weight, based on the weight of the thermoplastic polymer. More than about 10 percent by weight organo titanate can be used, but is not desirable from an economic standpoint.

The presence of an organo titanate prevents premature crosslinking of the water-curable thermoplastic polymer without adversely affecting the "final cure" of the polymer. As a result, the compositions of this invention, unmodified or modified by the subsequent addition of metal carboxylate silanol condensation catalysts can be extruded about wires and cables providing coatings thereon which can be water-cured to crosslinked products.

Suitable water-curable thermoplastic polymers having hydrolyzable, pendant silane moieties include so-called "graft" polymers produced by the organic peroxide catalyzed, i.e. free radical catalyzed reaction of a thermoplastic polymer with an unsaturated silane as described in U.S. Pat. No. 3,636,155, patented Feb. 29, 1972; as well as so-called "normal" polymers produced by a free radical catalyzed reaction of an olefinic monomer with an unsaturated silane as described in U.S. Pat. No. 3,225,018, patented Dec. 21, 1965 and in U.S. Pat. No. 4,413,066, patented Nov. 1, 1983.

Illustrative of thermoplastic polymers which are reacted with an unsaturated silane to produce graft polymers are normally solid homopolymers and interpolymers of monoolefins and diolefins.

Suitable monoolefins have the general formula:

$$C_\alpha H_{2\alpha} \qquad \text{FORMULA I}$$

wherein $\alpha$ has a value of at least 2. Exemplary of olefins falling within the scope of Formula I are: ethylene, propylene, butene-1, pentene-1, 4-methyl-pentene-1, hexene-1, heptene-1, octene-1 and the like.

Suitable diolefins have the general formula:

$$C_\beta H_{2\beta-2} \qquad \text{FORMULA II}$$

wherein $\beta$ has a value of at least 3. Exemplary of diolefins falling within the scope of Formula II are: 1,4-pentadiene, 1,3-hexadiene, 1,5-hexadiene, 1,4-octadiene, ethylidene norbornene and the like.

Illustrative of monomers which can be polymerized with monoolefins and/or diolefins are styrene, p-methyl styrene, α-methyl styrene, p-chloro styrene, vinyl naphthalene and similar aryl olefins and substituted aryl olefins; nitriles such as acrylonitrile, methacrylonitrile, α-chloroacrylonitrile and the like; vinyl methyl ketone, vinyl methyl ether, vinylidene chloride; alkyl acrylates which fall within the scope of the following formula:

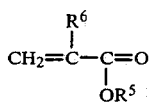

FORMULA III wherein $R^6$ is hydrogen or methyl and $R^5$ is alkyl having 1 to 8 carbon atoms inclusive. Illustrative compounds encompassed by this formula are: methyl acrylate, ethyl acrylate, t-butyl acrylate, methyl methacrylate, n-butyl acrylate, n-butyl methacrylate, 2-ethylhexyl acrylate, chloroethyl acrylate and the like; provided that the olefinic content is at least about 0.1 percent by weight, preferably about 1 to about 50 percent by weight.

It is to be understood that mixtures of reactants can be utilized to produce suitable polymers.

Desirable polymers are alkylene-alkyl acrylate copolymers generally having a density (ASTM D-1505 with conditioning as in ASTM D-147-72) of about 0.92 to about 0.94 and a melt index (ASTM D-1238 at 44 psi tested pressure) of about 0.1 to about 500 decigrams per minute. These copolymers generally have about 1 to about 50 percent by weight combined alkyl acrylate, preferably about 2 to about 20 percent by weight combined alkyl acrylate.

Preferred polymers are ethylene-propylene copolymers, ethylene-butene copolymers, ethylene-hexene copolymers and the like produced under low pressures on the order of about 15 to 300 psi.

Particularly preferred polymers have densities (ASTM D-1505) of about 0.875 to about 0.970, preferably about 0.875 to about 0.930. These polymers can be prepared by reacting a mixture containing about 50 to about 99.9 mole percent, preferably about 75 to about 96 mole percent ethylene and from about 0.1 to about 50 mole percent and preferably about 4 to about 25 mole percent of one or more $C_3$ to $C_8$ alpha olefins previously described.

Illustrative of monomers or mixtures of monomers which can be reacted with an unsaturated silane to produce so-called "normal" polymers are those polymerizable monomers previously described.

Suitable unsaturated silane reactants have the general formula:

FORMULA IV wherein A is an unsaturated hydrocarbon radical or an unsaturated hydrocarbonyloxy radical and wherein other variables are as defined below.

Particularly desirable unsaturated silanes fall within the scope of Formula V and Formula VI:

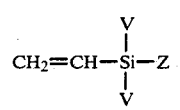

FORMULA V wherein each V can be hydrogen, a hydrocarbon radical or a hydrolyzable group. Illustrative of suitable radicals are alkyl radicals having 1 to 18 carbon atoms inclusive, preferably 1 to 6 carbon atoms inclusive such as methyl, ethyl, n-propyl, isopropyl, n-butyl, n-hexyl and the like; alkoxy radicals having 1 to 18 carbon atoms inclusive, preferably 1 to 8 carbon atoms inclusive, such as methoxy, ethoxy, propoxy, hexoxy, octoxy, dodecyloxy, methoxyethoxy and the like; aryl radicals having 6 to 8 carbon atoms inclusive such as phenyl, methylphenyl, ethylphenyl and the like; cycloaliphatic radicals having 5 to 8 carbon atoms inclusive such as cyclopentyl, cyclohexyl, cyclohexyloxy and the like.

Z is a hydrolyzable group among which can be noted alkoxy radicals as previously described for V or oxyaryl radicals such as oxyphenyl and the like; oxyaliphatic radicals such as oxyhexyl and the like; halogens such as chlorine and the like and other hydrolyzable groups as further described in U.S. Pat. No. 3,408,420 to John B. Wiggill, patented Oct. 29, 1968:

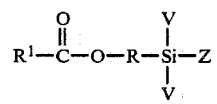

FORMULA VI wherein $R^1$ is an unsaturated monovalent hydrocarbon radical having a maximum of 18 carbon atoms as for example alkylene radicals having 2 to 18 carbon atoms inclusive, preferably 2 to 4 carbon atoms inclusive such as ethylene, propylene, isobutylene and the like. Other variables are as previously defined.

Among suitable silanes falling within the scope of Formula IV can be noted vinyltrimethoxy silane, vinyltriethoxy silane, vinyltris(n-propoxy)silane, vinylbis-(methoxy)methyl silane, vinylbis-(ethoxy)methyl silane, vinylbis-(n-propoxy)methyl silane, vinylmethoxydimethyl silane, vinylethoxydimethyl silane, allyltrimethoxy silane as well as the following silanes:

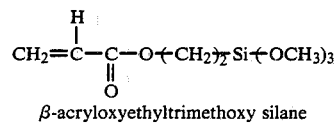

β-acryloxyethyltrimethoxy silane

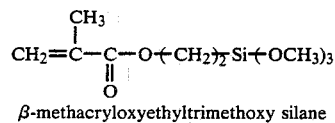

β-methacryloxyethyltrimethoxy silane

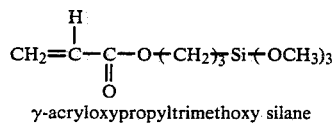

γ-acryloxypropyltrimethoxy silane

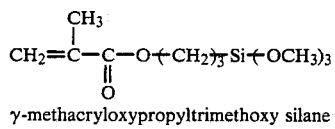

γ-methacryloxypropyltrimethoxy silane

-continued $$CH_2=\underset{O}{\overset{CH_3}{\underset{\|}{C-C}}}-O(CH_2)_3\underset{CH_3}{\overset{|}{Si}}(OCH_2CH_3)_2$$

γ-methacryloxypropyl(methyldiethoxy) silane $$CH_2=\underset{O}{\overset{CH_3}{\underset{\|}{C-C}}}-O(CH_2)_2Si(OC_2H_5)_3$$

β-methacryloxyethyltriethoxy silane $$CH_2=\underset{O}{\overset{CH_3}{\underset{\|}{C-C}}}-O(CH_2)_3Si(OC_2H_5)_3$$

γ-methacryloxypropyltriethoxy silane $$CH_2=\underset{O}{\overset{CH_3}{\underset{\|}{C-C}}}-O(CH_2)_3Si(OC_2H_4OCH_3)_3$$

γ-methacryloxypropyl-tris-(2-methoxyethoxy) silane $$CH_2=\underset{O}{\overset{CH_3}{\underset{\|}{C-C}}}-O(CH_2)_3Si(OC_4H_9)_3$$

β-methacryloxypropyl-tris-(n-butoxy) silane $$CH_2=\underset{O}{\overset{CH_3}{\underset{\|}{C-C}}}-O(CH_2)_3Si(OC_{12}H_{25})_3$$

γ-methacryloxypropyl-tris-(n-dodecyloxy) silane $$CH_2=\underset{O}{\overset{CH_3}{\underset{\|}{C-C}}}-O(CH_2)_3Si(OC_4H_9)_3$$

γ-methacryloxypropyl-tris-(iso-butoxy) silane $$CH_2=\underset{O}{\overset{CH_3}{\underset{\|}{C-C}}}-O(CH_2)_3Si(OC_3H_7)_3$$

γ-methacryloxypropyl-tris-(isopropoxy) silane

Particularly desirable water-curable thermoplastic polymers for purposes of this invention contain about 0.01 to about 15 percent by weight unsaturated silane.

Organo titanates suitable for purposes of this invntion fall within the scope of Formula VII $$Ti(OR^2)_4 \qquad \text{FORMULA VII}$$

wherein each $R^2$, which can be the same or different, is a monovalent hydrocarbon radical having 1 to 18 carbon atoms inclusive, preferably 1 to 14 carbon atoms inclusive.

Exemplary of suitable hydrocarbon radicals for $R^2$ are alkyl radicals such as methyl, ethyl, n-propyl, isopropyl, butyl, octyl, lauryl, myristyl, stearyl and the like; cycloaliphatic radicals such as cyclopentyl, cyclohexyl and the like; aryl radicals such as phenyl, methylphenyl, chlorophenyl and the like; alkaryl radicals such as benzyl and the like.

Particularly desirable titanates falling within the scope of Formula VII are those wherein each $R^2$ is alkyl having 1 to 18 carbon atoms inclusive, preferably 1 to 14 carbon atoms inclusive, exemplified by tetrabutyl titanate, tetraisopropyl titanate, tetramethyl titanate, tetraethyl titanate and the like.

The water-curable, thermoplastic polymers and organo titanates can be admixed in any suitable apparatus, such as a Brabender mixer, Banbury mixer, extruder, two-roll mill and the like wherein the polymers are melted and fluxed with the organo titanates. During the fluxing, temperatures of the compositions are maintained sufficiently low to prevent generation of water in the compositions due to the presence of water-containing additives. Also, compositions of this invention are utilized for the intended purpose immediately upon formulation. Aging of the compositions, reduces the efficacy of the organo titanate.

The curing or crosslinking of the compositions of this invention is carried out by subjecting the compositions to a water bath which is generally at a temperature of about 70° C. to about 100° C. The actual time of the curing cycle will depend on the temperature of the water bath and the thickness of the composition being crosslinked.

Also, as previously stated, the crosslinking can be carried out in the presence of a metal carboxylate silanol condensation catalyst which serves to accelerate the crosslinking reaction. Among suitable metal carboxylate silanol condensation catalysts are the following: dibutyltin dilaurate, stannous acetate, stannous octoate, lead naphthenate, zinc octoate, iron-2-ethyl hexoate and the like.

To the compositions of this invention can be added various other additives, in amounts well known in the art, such as fillers among which can be mentioned carbon black, clay, talc, talc coated with a metal salt of a fatty acid having 8 to 20 carbon atoms, calcium silicate, calcium carbonate, silica, aluminum hydroxide and the like. Other additives include silanes such as vinyl-tris-(2-methoxyethoxy)silane and other like surface treating agents.

The compositions of this invention can be rendered flame retardant by the addition thereto of halogen containing flame retardants such as decabromodiphenyl oxide, ethylene(bis-tetrabromophthalimide), chlorinated polyethylene, polyvinyl chloride and halogenated paraffin waxes, alone or in admixture with inorganic compounds such as antimony oxide and/or alkaline earth metal oxides, carbonates, hydroxides and sulfates. Among such alkaline earth metal compounds can be noted calcium oxide, calcium carbonate, calcium hydroxide, calcium sulfate, magnesium oxide, magnesium carbonate, magnesium hydroxide and magnesium sulfate. Other additives such as smoke suppressants illustrated by zinc borate, molybdenum oxide and the like can also be used.

The compositions of this invention, although described primarily as extrudates about wires and cables, can be used in molding applications in general such as roto-molding, injection molding and blow molding to form shaped articles such as film, pipe and the like. Also, if desired, the compositions of this invention can be formed into foamed products.

It is to be noted that the disclosures of all patents referred to in the specification are incorporated herein by reference.

The following examples further illustrate the present invention and are not intended to limit the scope thereof.

Compositions, the formulations of which are set forth in Table I, were prepared as follows:

Control 1—an ethylene-vinyltrimethoxy silane copolymer was fluxed in a Brabender mixer for 5 minutes at a temperature of 160° C., under an argon gas atmosphere. The fluxed copolymer was discharged from the Brabender mixer, cooled to room temperature and stored under argon gas.

Control 2—prepared as described with respect to Control 1 with the exception that dibutyltin dilaurate was added over the last 30 seconds of the fluxing period.

Composition A—an ethylene-vinyltrimethoxy silane copolymer was fluxed for two minutes at a temperature of 130° C., and an organo titanate added to the fluxed copolymer. Fluxing was then continued for an additional two minutes at a temperature of 130° C. with dibutyltin dilaurate added over the last 30 seconds of the two-minute fluxing period. The fluxed composition was then discharged from the Brabender mixer, cooled to room temperature and stored under argon gas.

Composition B was prepared as described with respect to Composition A with the exception that no dibutyltin dilaurate was added.

Test plaques, 3 inches by 3 inches by 0.0075 inch, were prepared from Compositions A–B and Controls 1–2 and the test plaques were subjected to the Monsanto Rheometer test, described in detail in U.S. Pat. No. 4,018,852, patented Apr. 19, 1977.

Test plaques were prepared under the following conditions:
 temperature—110° C.–115° C.
 pressure—5000 psig
 time cycle—5 minutes Plaques were tested initially, as prepared, and also tested after being placed in a water bath, which was at a temperature of 70° C., for 16 hours. Initial and final rheometer readings are set forth in Table I.

brought rapidly, in approximately two minutes, to a temperature of 185° C. by increasing the mixing rate, and maintained at a temperature of 185° C. for an additional 5 minutes to insure completion of the grafting reaction between the polymer and the silane. The silane modified polymer was charged into a container, which was then sealed and stored under argon gas.

TABLE II

|  | Polymer 1 | Polymer 2 |
| --- | --- | --- |
| Ethylene-ethyl acrylate copolymer having a melt index of 1.5 and containing 16–18 percent by weight combined ethyl acrylate | 100 | 100 |
| Vinyltrioctoxy silane | 10.5 | — |
| Vinyltridodecyloxy silane | — | 15.4 |
| Di-α-cumyl peroxide | 0.4 | 0.4 |
| Antioxidant | 0.1 | 0.1 |

Compositions, based on Polymer 1 and Polymer 2, the formulations of which are set forth in Table III wherein amounts are in percent by weight, were prepared by fluxing all components together for five minutes at a temperature of 130° C. Plaques were prepared from the compositions, in a manner previously described and initial rheometer determinations made.

TABLE III

|  | Compositions | |
| --- | --- | --- |
|  | C | D |
| Polymer 1 | 36.75 | — |
| Polymer 2 | — | 36.75 |
| Aluminum trihydrate | 49.9 | 49.9 |
| Zinc borate | 8.0 | 8.0 |
| Vinyl-tris-(2-methoxyethoxy) silane (coupling agent) | 0.75 | 0.75 |
| Alkyl phosphate plasticizer | 4.0 | 4.0 |
| 1,2-Dihydro-2,3,4-trimethyl quinoline antioxidant | 0.6 | 0.6 |
| Rheometer - lbs-inch | | |
| Initial | 9 | 8 |

TABLE I

| Formulation | Control 1 | Control 2 | Example 1 Composition A | Example 2 Composition B |
| --- | --- | --- | --- | --- |
| Ethylene-vinyltrimethoxy silane copolymer | 40 grams | 40 grams | 40 grams | 40 grams |
| Dibutyltin dilaurate | — | 0.02 grams | 0.02 grams | — |
| Tetraethyl titanate | — | — | 1.2 grams | 1.2 grams |
| Rheometer - lbs-inch | | | | |
| Initial | 7 | 18 | 6 | 8 |
| Final | 8 | 45 | 48 | 47 |

The data show that the presence of an organo titanate prevents premature cure without adversely affecting the final cure.

Silane modified thermoplastic polymers were prepared according to the procedure described below wherein materials and amounts thereof, in parts by weight, are set forth in Table II.

Into a Brabender mixer, preheated to a temperature of 140° C., there was charged the unmodified polymer and polymerized 1,2-dihydro-2,3,4-trimethylquinoline, an antioxidant. The mixture was fluxed and to the fluxed mixture was added a silane, by means of a syringe. The resultant mixture was brought to homogeniety, as evidenced by a stable torque reading. To the homogeneous mixture, there was then added di-α-cumyl peroxide. The contents of the Brabender were Examples and Controls, the formulations of which are set forth in Table IV in parts by weight, were prepared by fluxing Compositions C and D and adding to the fluxed compositions tetramethyl titanate and/or dibutyltin dilaurate and then fluxing the resultant compositions for an additional five minutes at a temperature of 150° C. The tetramethyl titanate was added to the compositions prior to the addition of the dibutyltin dilaurate.

Plaques were prepared from the resultant compositions and rheometer determinations made initially, after aging in air and after aging in a water bath which was at a temperature of 70° C.

Compositions and test results are set forth in Table IV.

TABLE IV

|  | Control 3 | Control 4 | Example 3 | Example 4 | Control 5 | Control 6 | Example 5 | Example 6 |
| --- | --- | --- | --- | --- | --- | --- | --- | --- |
| Composition C | 100 | 100 | 100 | 100 | — | — | — | — |
| Composition D | — | — | — | — | 100 | 100 | 100 | 100 |
| Tetramethyl titanate | — | — | 3.0 | 3.0 | — | — | 3.0 | 3.0 |
| Dibutyltin dilaurate | — | 0.03 | — | 0.03 | — | 0.03 | — | 0.03 |
| Rheometer | 8 | 14 | 9 | 10 | 7 | 17 | 7 | 7 |
| Initial |  |  |  |  |  |  |  |  |
| Aged in Air |  |  |  |  |  |  |  |  |
| 1 day | — | 28 | 32 | 35 | — | 30 | 25 | 25 |
| 10 days | — | 36 | 73 | 73 | — | 34 | 78 | 84 |
| 4 weeks | — | 51 | 99 | 103 | — | 60 | 99 | 102 |
| Aged in 70° C. Water Bath |  |  |  |  |  |  |  |  |
| ½ hour | — | 37 | 86 | 72 | — | 26 | 58 | 78 |
| 2 hours | — | 36 | 94 | 94 | — | 59 | 76 | 74 |
| 4 hours | — | 45 | 98 | 105 | — | 56 | 73 | 72 |
| 12 hours | 8 | 49 | 82 | 80 | 8 | 54 | 72 | 78 |

What is claimed is:

1. A composition consisting essentially of a preformed water-curable thermoplastic polymer having hydrolyzable, pendant silane moieties, prepared in the presence of a free radical generating compound; and an organo titanate having the formula:

$$Ti(OR^2)_4$$

wherein each $R^2$ is a monovalent hydrocarbon radical having 1 to 3 carbon atoms inclusive, said organo titanate being present in at least about 0.05 percent by weight.

2. A composition as defined in claim 1 wherein said organo titanate is present in an amount of about 0.05 to about 10 percent by weight.

3. A composition as defined in claim 1 wherein said organo titanate is present in an amount of about 0.1 to about 5 percent by weight.

4. A composition as defined in claim 1 wherein said organo titanate is tetramethyl titanate, tetraethyl titanate or tetraisopropyl titanate.

5. A composition as defined in claim 1 wherein said pendant silane moieties are derived from vinyltrioctoxy silane.

6. A composition as defined in claim 1 wherein said pendant silane moieties are derived from vinyltridodecyloxy silane.

7. A composition as defined in claim 1 wherein said pendant silane moieties are derived from vinyltrimethoxy silane.

8. A composition consisting essentially of a preformed water-curable thermoplastic polymer having grafted thereto hydrolyzable, pendant silane moieties, prepared in the presence of a free radical generating compound; and an organo titanate having the formula:

$$Ti(OR^2)_4$$

wherein each $R^2$ is a monovalent hydrocarbon radical having 1 to 3 carbon atoms inclusive, said organo titanate being present in at least about 0.05 percent by weight.

9. A composition as defined in claim 8 wherein the said preformed, water-curable polymer is polyethylene having grafted thereto hydrolyzable, pendant silane moieties.

10. A composition as defined in claim 8 wherein the said preformed, water-curable polymer is an alkylene-alkyl acrylate copolymer having grafted thereto hydrolyzable, pendant silane moieties.

11. A composition as defined in claim 10 wherein the said alkylene-alkyl acrylate copolymer is an ethylene-ethyl acrylate copolymer having grafted thereto hydrolyzable, pendant silane moieties.

12. A composition as defined in claim 8 wherein said preformed, water-curable polymer is a polymer of ethylene and at least one $C_3$ to $C_8$ alpha olefin having grafted thereto hydrolyzable, pendant silane moieties.

13. A composition as defined in claim 12 wherein said ethylene polymer has a density of about 0.875 to about 0.970.

14. A composition as defined in claim 12 wherein said ethylene polymer is an ethylene-butene-1 copolymer.

15. A composition as defined in claim 8 wherein said water-curable thermoplastic polymer is an ethylene-ethyl acrylate copolymer having pendant silane moieties derived from vinyltrioctoxy silane and said organo titanate is tetraisopropyl titanate, tetraethyl titanate or tetramethyl titanate.

16. A composition as defined in claim 8 wherein said water-curable thermoplastic polymer is an ethylene-butene-1 copolymer having pendant silane moieties derived from vinyltrimethoxy silane and said organo titanate is tetraisopropyl titanate, tetraethyl titanate or tetramethyl titanate.

17. A composition consisting essentially of a preformed water-curable polymer of an olefinic monomer and an unsaturated silane, prepared in the presence of a free radical generating compound; and an organo titanate having the formula:

$$Ti(OR^2)_4$$

wherein each $R^2$ is a monovalent hydrocarbon radical having 1 to 3 carbon atoms inclusive, said organo titanate being present in at least about 0.05 percent by weight.

18. A composition as defined in claim 17 wherein said preformed, water-curable polymer is a copolymer of ethylene and an unsaturated silane.

19. A composition as defined in claim 18 wherein said preformed, water-curable polymer is a copolymer of ethylene and vinyltrimethoxy silane.

20. A composition as defined in claim 17 wherein said preformed, water-curable polymer is a copolymer of ethylene and vinyltrimethoxy silane and said organo titanate is tetramethyl titanate, tetraethyl titanate or tetraisopropyl titanate.

21. A process which consists essentially of admixing a preformed, water-curable thermoplastic polymer having hydrolyzable, pendant silane moieties, prepared in the presence of a free radical generating compound with at least about 0.05 percent by weight of an organo titanate having the formula:

$$Ti(OR^2)_4$$

wherein each $R^2$ is a monovalent hydrocarbon radical having 1 to 3 carbon atoms inclusive, forming said resultant composition into a shaped article and water-curing the said shaped article.

22. A process as defined in claim 21 wherein a metal carboxylate silanol condensation catalyst is added to the composition of said thermoplastic polymer and organo titanate prior to forming said composition into a shaped article.

23. A process as defined in claim 22 wherein said metal carboxylate is dibutyltin dilaurate.

24. A process of applying a coating onto a wire or cable which consists essentially of feeding a preformed, water-curable thermoplastic polymer having hydrolyzable, pendant silane moieties, prepared in the presence of a free radical generating compound, into an extruder wherein said polymer is melted, adding to said melted polymer at least about 0.05 percent by weight of an organo titanate having the formula:

$$Ti(OR^2)_4$$

wherein each $R^2$ is a monovalent hydrocarbon radical having 1 to 3 carbon atoms inclusive, fluxing the resultant composition and thereafter extruding the resultant composition about a wire or cable.

25. A process as defined in claim 24 wherein a metal carboxylate is added to the fluxed composition prior to extruding the composition about a wire or cable.

26. A process as defined in claim 25 wherein the metal carboxylate is dibutyltin dilaurate.

27. A composition as defined in claim 1 to which has been added a metal carboxylate silanol condensation catalyst.

28. A composition as defined in claim 27 wherein the metal carboxylate silanol condensation catalyst is dibutyltin dilaurate.

29. The crosslinked product of the composition defined in claim 1.

30. A wire or cable having thereon the composition or the crosslinked product of the composition defined in claim 1.

31. A composition as defined in claim 8 wherein said water-curable thermoplastic polymer is an ethylene-ethyl acrylate copolymer having pendant silane moieties derived from vinyltridodecyloxy silane and said organo titanate is tetraisopropyl titanate, tetraethyl titanate or tetramethyl titanate.

32. A composition as defined in claim 1 wherein the organo titanate is tetramethyl titanate.

33. A composition as defined in claim 1 wherein the organo titanate is tetraethyl titanate.

34. A composition as defined in claim 1 wherein the organo titanate is tetraisopropyl titanate.

* * * * *